Aug. 4, 1936.  G. A. LYON  2,049,461
SPARE TIRE COVER
Filed April 30, 1934  2 Sheets-Sheet 2
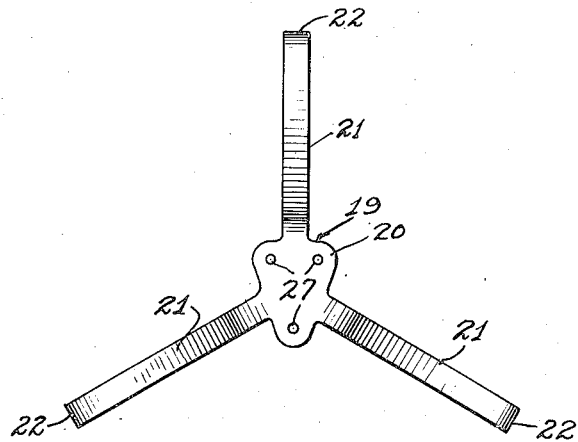
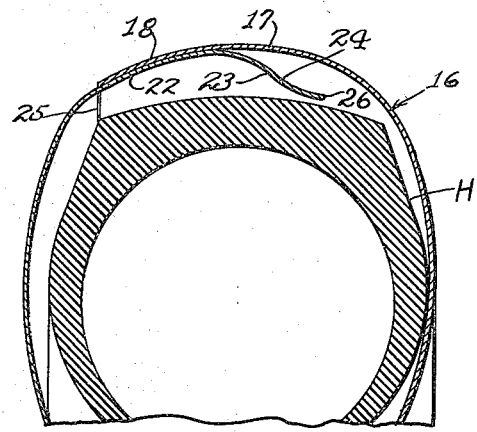
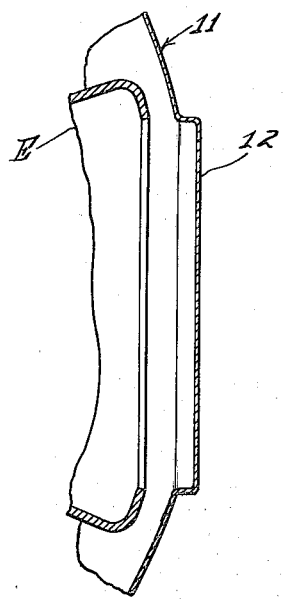
George Albert Lyon.

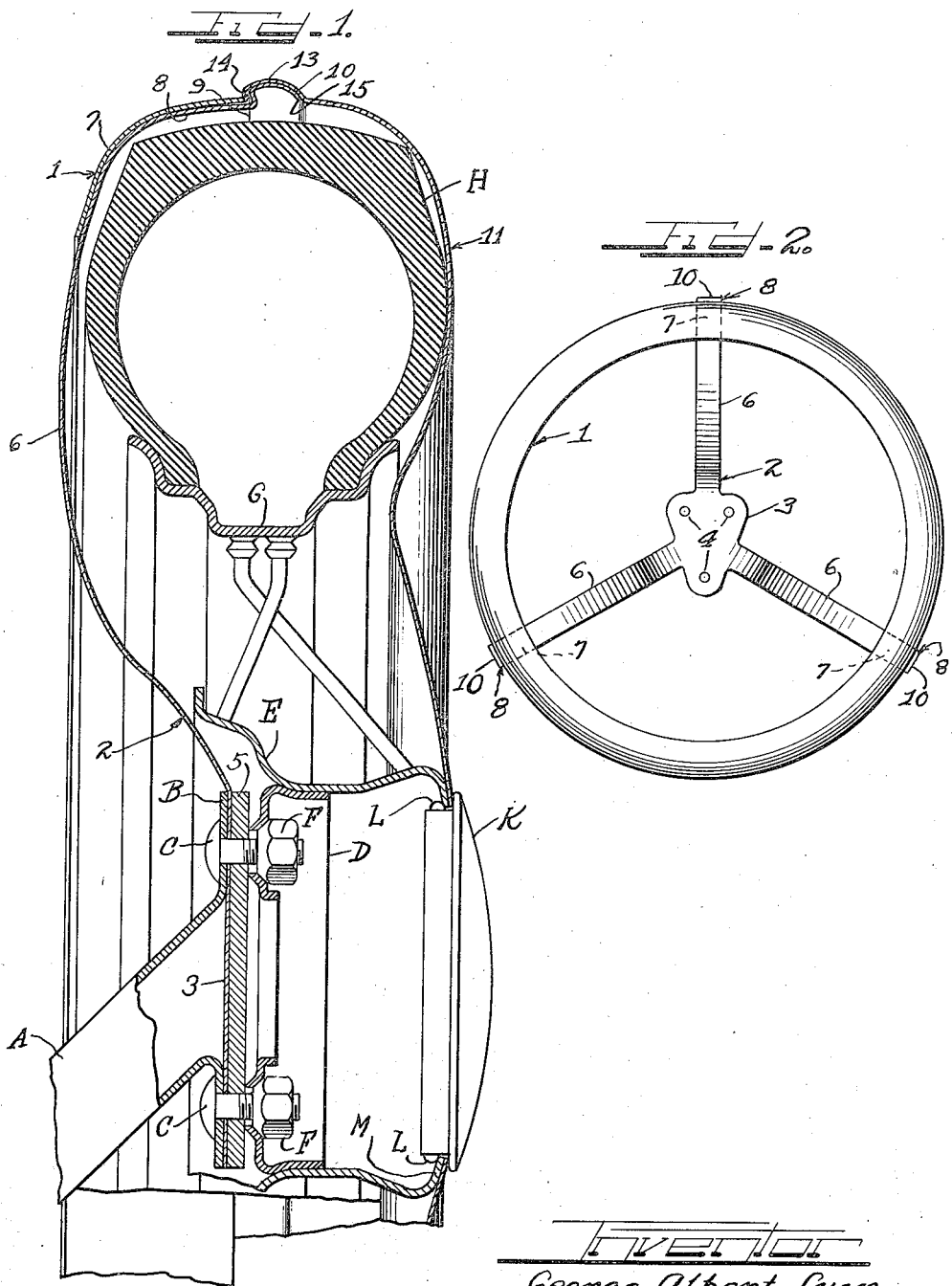

Patented Aug. 4, 1936

2,049,461

UNITED STATES PATENT OFFICE 2,049,461

SPARE TIRE COVER

George Albert Lyon, Detroit, Mich., assignor to Lyon Incorporated, Detroit, Mich., a corporation of Delaware Application April 30, 1934, Serial No. 723,049

6 Claims. (Cl. 150—54)

This invention has to do with tire covers and is concerned more particularly with a cover cooperating with a spare wheel carrier to provide a resilient support for a cover for the front of the spare wheel and tire.

It is an object of this invention to provide a cover construction including complemental members, one of which is arranged to be supported by the spare wheel carrier and to have means for resiliently supporting the other complemental cover member.

It is another object of the invention to provide front and rear cover members, the rear cover member being annular and having means whereby the same may be permanently carried by the spare wheel carrier.

It is another object of this invention to provide an annular rear cover member with means for supporting the same permanently on the automobile, together with resilient elements projecting forwardly and outwardly beyond the cover member to provide resilient anchors for releasably supporting a front cover member.

It is another object of this invention to provide a rear cover member with means whereby the same may be employed to support a front cover member, whereby the supporting means may be concealed by the front cover member by an ornamental and reinforcing bead.

It is a further object of the invention to provide a construction whereby a front cover member may be snapped automatically as the same is shoved rearwardly onto a tire, so as to be supported from the rear of the tire.

In accordance with the general features of the invention, one form involves the provision of a preferably annular rear cover member supported from the vehicle body as through the spare wheel carrier by suitable arms whose forward extensions provide yieldable anchor elements. A front cover member is arranged to extend over the tread of the tire sufficiently to cam said anchors inwardly and snap into interlocked relation thereto, so that the front cover member is yieldably mounted indirectly upon the carrier. The front cover member may be provided with a central opening to enable the hub cap to be inserted therethrough and interlocked with the wheel hub to thereby also hold the central part of the cover member against the hub. The front cover member may also be imperforate at its center so as to conceal the front hub opening.

In accordance with another form of the invention, the rear cover member is dispensed with, and a bracket attached to the carrier is provided with arms which extend outwardly and forwardly over the tread of the tire and so located as to be cammed inwardly as the front cover member is shoved rearwardly into place and to thereafter expand so as to engage within an inturned peripheral portion of the front cover member to thereby yieldably hold the front cover member in proper tire protecting position.

It will be seen with this construction that no manipulation is necessary in order to connect the front and rear cover members in accordance with one form of the invention and to connect the front cover member with the other supporting means therefor as provided for in the other form of the invention above mentioned, since this can be effected merely by the rearward movement of the front cover member, and the same may be likewise separated from the supporting means therefor merely by moving the same forwardly away from the tire.

Further objects and advantages of the invention will appear as the description proceeds.

This invention (in preferred forms) is illustrated in the drawings and hereinafter more fully described.

On the drawings:

Figure 1 is a fragmentary sectional view showing one form of the tire cover construction embodying the invention.

Figure 2 is a reduced rear elevational view of the rear cover structure of Figure 1.

Figure 3 is a sectional view of the center construction of a modified form of front cover member and its relation to the spare wheel hub.

Figure 4 is a view similar to that appearing at the upper part of Figure 1 but showing a modified form of the invention.

Figure 5 is a reduced rear elevational view of the supporting means for the cover shown in Figure 4.

Referring now more particularly to the drawings, the automobile (not shown) may be provided with a spare wheel carrier A located at either side or at the rear or any other part of the automobile. The carrier A is provided with an attaching flange B to which are permanently connected studs C whose threaded shanks extend forwardly so as to pass through corresponding openings in the attaching collar D of the hub E to receive the mounting nuts F, said nuts being also usable in the mounting of the spare wheel G in a position to support the automobile. The wheel G is shown in Figure 1 to have mounted thereon a spare tire H whose presence, however, is not necessary to the operation and employment of the cover constructions to be hereinafter described.

In accordance with one form of the invention, the cover construction comprises a rear annular cover member 1 arranged to cover the rear part of the tread of the tire H and the adjacent portion of the rear wall of the tire. The cover member 1 is held in position by a bracket which in the illustrated form of the invention comprises a spider 2 having a body 3 provided with openings 4 and arranged to be positioned in front of the flange B to permit the studs C to pass therethrough, a retaining plate 5 being permanently united with the flange B as by welding, riveting or in any other suitable manner so as to permanently secure the body 3 to the carrier A. The spider 2 is provided with a plurality of substantially radiating arms 6 welded to the interior of the cover 1 at 7 or secured thereto by riveting or in any other suitable way. The arms 6 are form-retaining and are arranged to hold the cover member 1 substantially co-axial with the spare wheel when the latter is mounted on the carrier A. The cover member is of such a shape and size as to provide substantial clearance between the same and the tire so that tires of various sizes may be accommodated thereby.

The arms 6 beyond their connections 7 with the cover member 1 are provided with forward extensions 8 which, adjacent the forward edge 9 of the cover member 1, are bent outwardly in a generally radial direction so as to project slightly outwardly beyond said edge and are then bent forwardly and arcuately with convex surfaces outermost as at 10, terminating forwardly preferably slightly beyond the median plane of the spare wheel, when the same is mounted on the carrier A. The arms 6 are preferably formed of resilient material such as sheet metal and are preferably somewhat spaced inwardly from the cover member 1 adjacent the edge 9 of the latter when the front cover member is mounted thereon.

The front cover member 11 of the form appearing in Figure 1 is preferably in the form of a plate having a substantially central opening of substantially the same diameter as the opening in the front wall M of the hub E to enable the skirt of the hub cap K to pass therethrough and enable the releasable spring or other latch elements L to be interlocked with said walls, the flange of the cap K in such case engaging the cover member 11 adjacent its openings and pressing the same against the hub so as not to rattle thereagainst. If desired, however, the front cover member 11 could be made substantially imperforate as shown in Figure 3 at 12 so as to cover the hub as well as the spare wheel and tire.

The front cover member 11 is shaped so as to extend rearwardly over the tread and provide a marginal bead 13 arranged at the median plane of the tire when in proper tire protecting position, so as to receive therein the arcuate portions 10 of the extensions 8. The diameter of the free edge 14 of the bead 13 is slightly greater than the diameter of the circle in which the free forward ends 15 of the portions 10 normally lie, so that as the front cover member 11 is shoved axially and rearwardly relative to the rear cover member 1, said edge 14 will engage the forward outer surfaces of the portions 10 and cam said portions inwardly and snap thereover into the relationship as shown in Figure 1. In this position, the edge 14 is preferably slightly rearward of the forward edge 9 of the cover member 1, so as to conceal the same. The bead 13 accordingly not only serves as a means whereby the cover members are automatically connected together, but provides ornamentation and reinforcement for the cover at its outer periphery.

In accordance with the form of the invention appearing in Figures 4 and 5, the front cover member 16 is the only covering member employed. This member is preferably similar to the cover member 11 in general contour, simulating the cross-sectional form of the spare wheel and tire, and is provided with an opening at its center for cooperation with the spare wheel hub cap K or the cover member 16 may be made imperforate and of the form shown at 12 in Figure 3 so as to conceal the hub from the front. The cover member 16, however, extends substantially entirely across the tread of the tire H so as to have its free marginal edge terminate in substantially the plane of the rear margin of the tire tread when properly associated with the tire. The tread covering portion 17 of the cover 16 is transversely substantially concavo-convex to simulate the shape of the tire at the tread and has its free marginal portion turned inwardly of the outermost periphery thereof as shown at 18.

To the end that the cover member 16 may be properly positioned, a bracket, which for illustrative purposes only is shown in the form of a three legged spider 19, is provided. The spider 19 has a body 20 and limbs 21 of the same general form as the limbs 6 in Figures 1 and 2, so as to clear the rear side wall and tread of the tire H, the portions 22 of said limbs 21 extending over the tread of the tire having their forward ends 23 inclined inwardly to provide a cam surface 24 over which the free edge 25 of the said covering portion 17 is adapted to ride. The end portion 23 is so arranged that its extremity 26 is disposed radially inwardly of the edge 25 of the cover member 16, and the outermost portion of the end portion 23 is normally disposed substantially outwardly of the edge 25. The outer portions 22 of the limbs 21 are so arranged that when the same are disposed within the tread covering portion 17 of the cover member 16, the outer portions 22 of said limbs resiliently exert an outward pressure upon the rear marginal portion 18 of said tread covering portion 17, thereby centering the cover member 16 and at the same time exerting a rearward force thereon so as to prevent accidental removal of the cover member 16, holding the latter engaged with the tire H to prevent rattling. When it is desired to remove the cover member 16, it is necessary merely to grasp the same as at the edge 25 thereof and pull away from the vehicle.

The head 20 of the spider 19 is provided with a plurality of openings 27 serving the same function as the holes 4 of the spider 2 in Figures 1 and 2.

The spiders are preferably formed of resilient material for the purposes above stated. The cover members of each of the forms of the invention herein described are preferably made of form-retaining material such as sheet metal, composition rubber, fiber, phenolic condensation products or the like.

While the extensions 8 of the spider arms 6 are shown integral with the spider, it will be appreciated that the arms 6 could terminate at their points of connection at 7 with the cover member 1, and the portions 8 could be individually applied to the cover member 1.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Cover construction for a spare tire carried by an automobile, said construction comprising rear and front cover members, and spring means carrying one of said members and arranged to snappingly interlock with the other member and support said other member free of said one member when said members are brought together into cooperative relation.

2. A cover construction for a spare tire carried by an automobile, said construction comprising a pair of substantially circular members formed to cover portions of the tire, and spring means connecting said members together and to the automobile, said spring means being common to both said members and being supported independently of them on the automobile.

3. A cover construction for a spare tire carried by an automobile, said construction comprising a pair of substantially circular members formed to cover adjacent portions of the tire, spring means supporting one of said members from the automobile, the other member being formed to snap into interlocking engagement with said means.

4. A cover construction for a spare tire carried by an automobile, said construction comprising rear and front cover members, and spring means connected to the automobile and carrying one of said members and arranged to snappingly interlock with the other member and support said other member free of said one member when said members are brought together into cooperative relation.

5. In an automobile affording a support for a spare wheel and tire, a spare tire cover comprising rear and front cover members, and spring means mounted on said support and carrying one of said members and arranged to snappingly interlock with the other member when said members are brought together into cooperative relation.

6. In an automobile affording a support for a spare wheel and tire, a spare tire cover member, and spring arms supported from the automobile and arranged to snappingly interlock with and carry said member, said arms extending forwardly and inwardly over the tread of the tire to provide outwardly bulged portions with forwardly facing cam surfaces, said member having inwardly and rearwardly disposed means arranged to engage said surfaces and cam said portions inwardly and snappingly engage over said portions.

GEORGE ALBERT LYON.